United States Patent Office 3,114,929
Patented Dec. 24, 1963

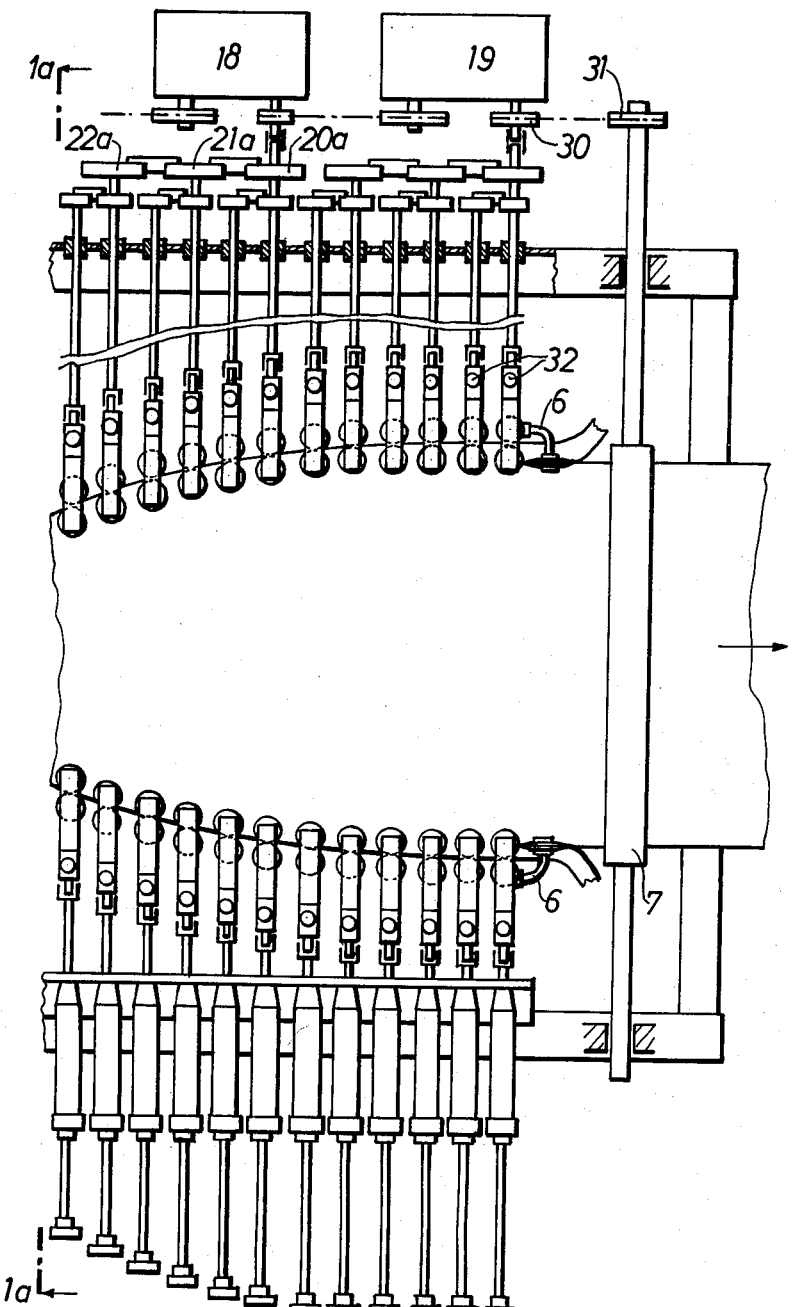

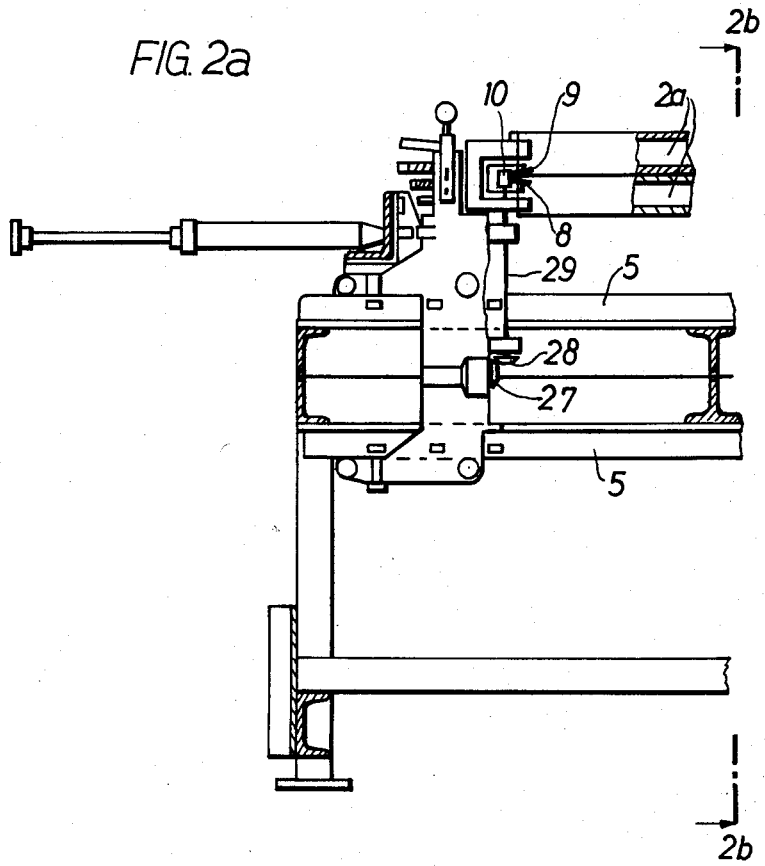

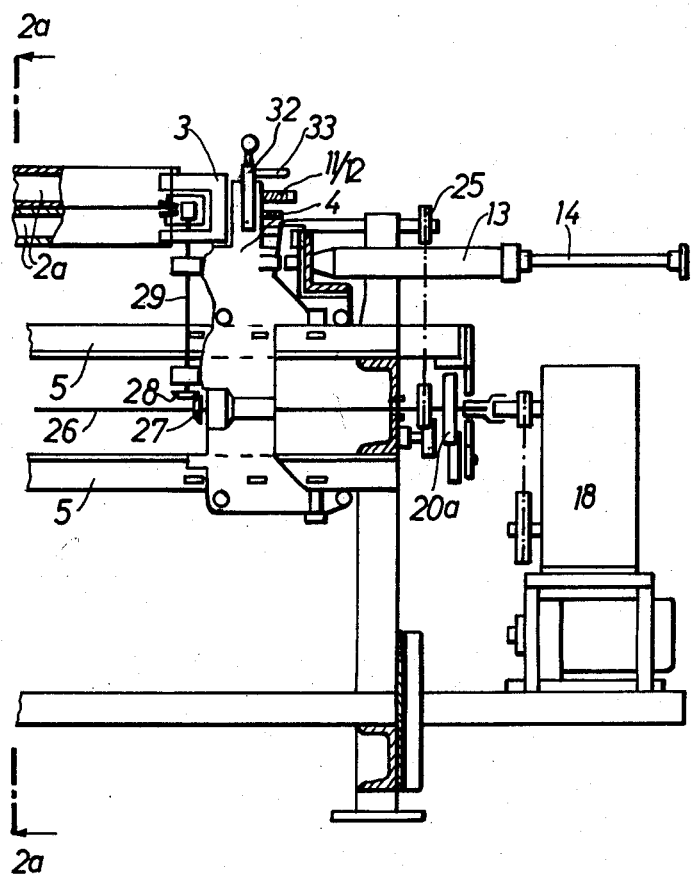

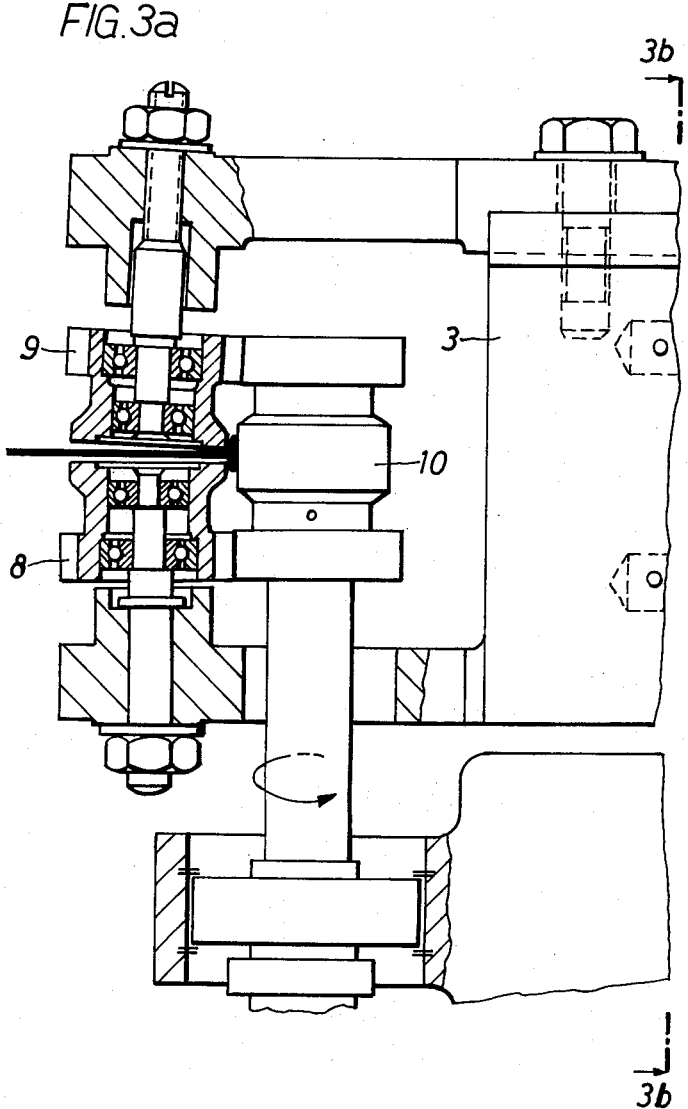

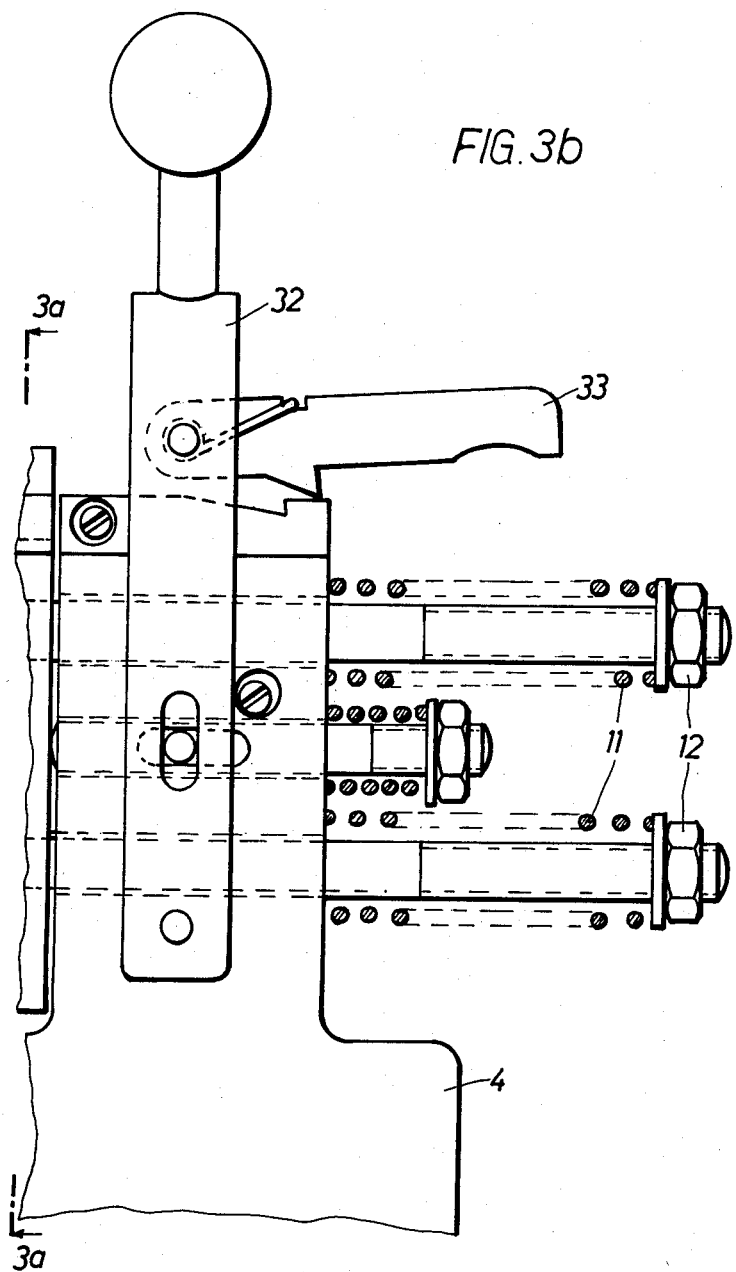

3,114,929
APPARATUS FOR THE CONTINUOUS BIAXIAL
STRETCHING OF A TRAVELING SHEET
Hieronymus Zygan, Leverkusen, Otto Koch, Cologne-Stammheim, Hermann Schnell, Krefeld-Uerdingen, Arthur Prietzschk, Dormagen, and Kurt Römling, Leverkusen, Germany, assignors to Farbenfabriken Bayer Aktiengesellschaft, Leverkusen, Germany, a corporation of Germany
Filed Dec. 7, 1960, Ser. No. 74,415
Claims priority, application Germany Dec. 12, 1959
7 Claims. (Cl. 18—1)

This invention relates to the manufacture of plastic foil webs and more particularly to an apparatus for simultaneously biaxially stretching a continuously traveling foil web.

It has been heretofore known to simultaneously biaxially stretch continuous traveling foil webs of thermoplastic materials. These different processes and apparatuses have the general configuration of two, spaced endless belts which carry gripping means to firmly hold the edge of the film to be stretched. The endless belts are then caused to rotate so that the gripping means cause the film to be moved in the longitudinal direction while simultaneously applying transverse forces which stretch the film in a direction substantially at right angles to the direction of movement of film. This type of apparatus is disadvantageous for the reason that the speed of the endless belt controls the marginal speed of the film thus preventing the control of the speed of the film through the device at each individual holding member. Thus, when working by this method, the importance of the course of the stretching process as a function of time between initial and final conditions of the film, i.e. to the kinematics of the stretching procedure, is not taken into account. Although the increase in the width and length of the foil web which results from the stretching is adjustable in the apparatus of the prior art, the kinematics of the stretching procedure in each of the known apparatuses is nevertheless substantially fixed since it is impossible to achieve every possible desired variation between the course of longitudinal and transverse stretching as a function of time or every desired interrelationship therebetween. Therefore, the foil web can be stretched to produce the desired satisfactory results only if the kinematics of the stretching process which are established beforehand correspond to the actual constructure of the apparatus used to carry out the process. This in most cases is not entirely the case and, therefore, the properties of the resulting stretched foil web are not an optimum value.

It is an object of this invention to provide an improved apparatus for biaxially stretching a continuously traveling foil web. It is still another object of this invention to provide an improved apparatus for biaxially orienting thermoplastic foil webs. It is a further object of this invention to provide an adjustable apparatus which can be suited to the kinematics of any stretching operation. It is a still further object of this invention to provide an improved apparatus which permits adjustment of the kinematics of the stretching operation in all parameters establishing it, independently of the final dimensions of the foil web after stretching. It is a further object to provide a film-holding device which is adjustable with respect to the longitudinal speed of the traveling web and also with respect to the degree of transverse stretching.

The foregoing objects and others which will become apparent from the following description taken in conjunction with the accompanying drawings are accomplished in accordance with the invention, generally speaking, by providing an apparatus and a method for simultaneously biaxially stretching thermoplastic foil webs having marginally reinforced thickened portions which include a plurality of separate holding devices on each side of the foil web which engage the marginal thickened portions, each of which holding devices has a means for independently regulating the longitudinal speed of the margin of the foil web and also a means for regulating the distance of the corresponding holding devices, actually facing each other, on either side of the foil web, independently of the other pairs of corresponding holding devices, to cause the stretching of the foil web in the transverse direction. Thus, the invention contemplates both the method and apparatus for producing a biaxially oriented foil web having reproducible properties through the entire length and width of the web by continuously controlling the marginal velocity at discrete points along the path of the foil web through the apparatus while, at the same time, controlling the amount of transverse stretching at each point along the length of the web within the apparatus by controlling the distance separating opposing holding devices on either side of the foil web. The combination of a pair of input and output rollers whose peripheral speeds are independently regulated and the holding devices move the film longitudinally, thus, providing a completely defined, but arbitrarily selective dependence of the marginal speed on the place in the stretching apparatus at that moment being subjected to stretching, this being independent of the final dimensions of the foil webs after the stretching. That is, by this method and apparatus, it is possible to achieve on the entire surface of the foil web any desired kinematics of the stretching operation and, more especially, those kinematics which are most suitable for the purpose actually required, this being dependent of the final dimensions of the foil web after the stretching is completed.

The process and apparatus of this invention will become more apparent in conjunction with the accompanying drawings in which like reference characters indicate like reference parts and in which:

FIGURE 1b is a plan view of the right hand side of the stretching apparatus in accordance with this invention.

FIGURE 2a is a sectional view of FIGURE 1 taken transversely of the direction of movement of the foil web and of the portion to the left of the center line of the foil web.

FIGURE 2b is a sectional view of FIGURE 1 taken transversely of the direction of movement of the foil web and of the portion of the right of the center line of the foil web;

FIGURE 3a is a sectional view through the holding devices in accordance with this invention; and FIGURE 3b is a view of the mechanism which permits the transverse movement of the holding device shown in FIGURE 3a.

Figure 1A:
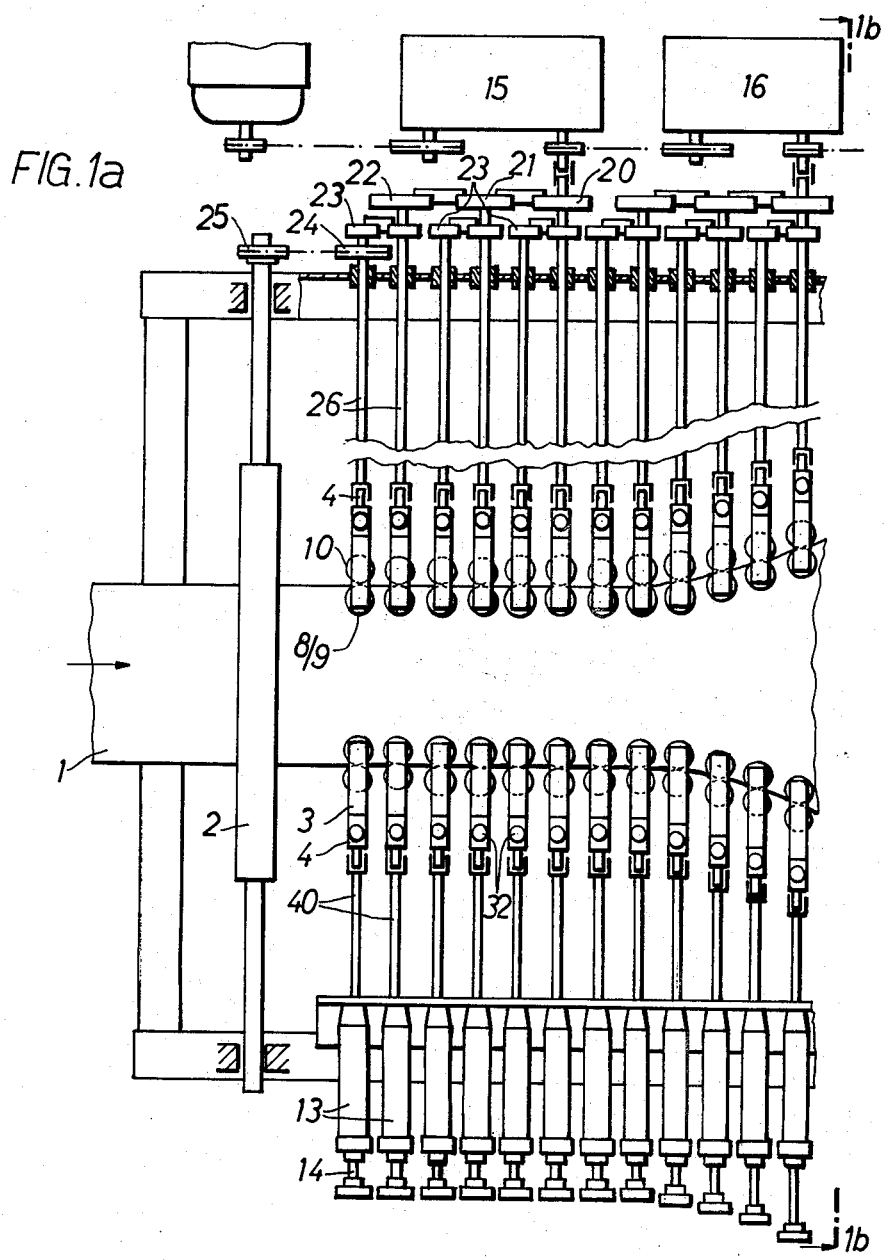
FIGURE 1a is a plan view of the left hand side of the stretching apparatus in accordance with this invention.

As stated above, the holding devices are each provided with means for independently regulating the marginal need of the foil web in the longitudinal direction and also with a means for displacing the holding devices transversely of the direction of travel of the web, which is also independently regulated with respect to the other holding devices. With particular respect to the drawings, FIGURE 1 illustrates the path taken by the foil web through the apparatus in accordance with this invention which stretches the foil web simultaneously both longitudinally and transversely. The foil web 1 which has marginally reinforced thickened portions and which may come either directly from an extruding device or from storage rollers is introduced through a pair of inlet or feed rollers 2 into the stretching apparatus. In order to insure that the marginally thickened portions or beads of the web are not crushed, the inlet rollers have a suitable rubber covering 2a as shown in FIGURE 2. The web after passing through said rollers 2 is taken up by a plurality of holding devices 3 which engage the marginally thickened portions in the manner illustrated in FIGURE 3. The plurality of holding devices 3 are mounted on a plurality of carriages 4 which are movable along rails 5 arranged transversely of the direction of movement of the foil. Each holding device 3 which is connected to a movable carriage 4 is connected by means of a rod 40 to a fixed pressure cylinder 13. There is one pressure cylinder for each holding device carriage combination. The maximum movement of each holding device 3 in the transverse direction is limited by an adjustable stud 14. Of course, the holding devices 3 do not move in the longitudinal direction but cause the movement of the foil by rotation. Further, by adjustment of the pressure within each of the cylinders 13, for example, by means of a reducing valve (not shown), it is possible to control the transverse displacement of each holding device 3 by the force exerted on the carriage 4 due to the pressure within the cylinder 13. This force exerted on the carriage 4 can be determined in advance and is independent of the position of the carriage.

It can, therefore, be readily seen that the stretching at any particular point along the length of the foil web is controlled by the transverse distance between corresponding holding devices disposed immediately opposite each other on either side of the web.

Fixed to the last holder device immediately before the output rollers 7 is a knife or cutter device 6 which severs the marginal bead from the foil. The foil may then be stored on a wind-up roll as is well known in the art. The marginal portion may then be returned to the extruding device or other apparatus for preparing the foil and reworked into a foil.

With respect to the manner by which the marginal thickened portion of the foil web is held by the holding device, FIGURE 3 illustrates the carriage 4 which is provided with a bearing having journaled therein a shaft to which is directly coupled driving wheel 10. Wheel 10 has connected thereto gears which engage teeth provided on driven wheels 8 and 9. Wheels 8 and 9 are positioned at a slight angle with respect to the plane of wheel 10. In the initial position, that is, when the foil web is first introduced through the feed rollers 2, the wheels 8 and 9 are held away from wheel 10 by action of the lever arm 32 and a detent 33 whereby the marginally reinforced portion is fed between the wheels 8 and 9, and 10. The lever arm 32 is then moved away from the margin of the foil, thus, moving wheels 8 and 9 toward wheel 10 tightly engaging the reinforced thickened portion therebetween and preventing any slippage of the marginal reinforced portion from the wheel 10. In order to guarantee a reliable driving action even where there is a relatively large ratio between the speeds of adjacent holder device, springs 11 are provided which, in conjunction with adjustable nuts 12, control the force that wheels 8 and 9 grip the marginal thickened portion and thereby hold it tightly against wheel 10. It can, thus, be seen that the holding device 3 not only positions marginally reinforced thickened portions transversely of the direction of travel by movement of the carriage 4, but also imparts longitudinal motion to the foil web due to the driving action of the wheel sets 8, 9 and 10.

The longitudinal stretching of the foil, which is accomplished simultaneously with the transverse stretching, is achieved by cooperation of the speed ratio of the inlet and outlet rollers and of the separate holding devices. The drive for the wheel sets 8, 9 and 10 belonging to each of the individual holding devices 3 is subdivided into several groups. That is, for example, five wheel sets may belong to each group. The speeds of the individual groups composed of the five wheel sets can be altered by means of regulating gears 15, 16, 17, 18 and 19 without shutting down the stretching apparatus while the foil is continually passed therethrough. Each of the individual wheel sets 8, 9 and 10 are connected through gear trains to one of the regulating gears 15, 16, 17, 18 and 19. Each gear train is composed of gear wheels 20, 21, 22 and 23. Thus, the speed of rotation of each wheel set 8, 9 and 10 can be altered by changing the size of one or more of the gears 20, 21, 22 and 23 of the gear train. The peripheral speed of the pair of feed rollers 2 is determined by the first regulating gear 15, gear wheels 20, 21, 22 and 23 of the first group which are connected to regulating gear 15 and sprocket wheels 24 and 25. As shown in FIGURE 1, the first regulating gear 15 is connected to a motor with the remaining regulating gears connected in series with regulating gear 15. The last regulating gear 19 is provided with a sprocket wheel 30 to drive the output rollers 7 by means of a connection through sprocket wheel 31. The wheels sets 8, 9 and 10 are driven by a shaft 26 which has a longitudinal groove or keyway and on which is mounted a beveled gear 27. Gear 27 is freely displaceable in the groove which permits the movement thereof to mesh with another beveled gear 28 independently of the position of carriage 4 along the transverse rail 5. The beveled gear 28 is mounted on a shaft 29 which is journaled in bearings provided on the carriage 4. The other end of shaft 29 carries the driving gear 10 of the associated wheel sets 8, 9 and 10. In this way, the rotational movement is transmitted to the holding devices 3 without thereby producing a force component in the direction of the free movement of the carriages. The wheel sets 8, 9 and 10 can, thus, be independently controlled with respect to the peripheral speed thereof, so if desired, every pair of wheel sets in the entire apparatus could have a different speed depending upon the kinematics of the particular stretching operation desired. For example, each succeeding wheel set can have a slightly greater peripheral speed, thus, causing the longitudinal stretching to take place in small increments.

The stretching of the foil thus takes place between the pairs of inlet feed rollers 2 and outlet rollers 7. The area between these rollers where the biaxial stretching takes place is provided with any suitable heating means (not shown) known in the art, such as, for example, electric resistance heaters, gas-type heaters in the form of burners disposed beneath the foil, pipes carrying a heated liquid, such as, oil infra-red heaters, such as, lamps and the like.

An essential advantage which results from the connection in series of the regulating gear is that the adjustment of any desired regulating gear alters only the speed ratio within the associated range. That is, by altering the regulating gears, the speeds of the holding devices which are connected to that particular regulating gear by the gear train, are altered. Of equal importance is the fact that no undesirable folding of the foil between two holding devices 3 can result since the peripheral speed of the wheel sets 8, 9 and 10, seen in the direction of travel of the foil cannot be smaller if, as is the case here, the regulating gears do not permit any step-down ratio.

The process and apparatus of this invention is suitable for orienting all types of thermoplastic films, such as, cellulose, esters, regenerated cellulose, polyvinyl and polyvinylidene-type resins, nylon, rubber hydrochloride, polycarbonates, polyethylene, and polystyrene films and other elastomeric or thermoplastic resins. The process and apparatus of this invention are particularly suitable for orienting polycarbonate films and foils because the amount of force both longitudinally and transversely of the direction of travel of the film at any given point on the film can be closely controlled. Temperatures between the feed rollers and the output rollers should be controlled within the range of from about 10° C. to about 180° C.

Although the invention has been described in considerable detail for the purpose of illustration, it is to be understood that variations may be made therein by those skilled in the art without departing from the spirit of the invention and the scope of the claims.

What is claimed is:

1. An apparatus for biaxially stretching a continuous traveling web material having a marginal reinforced thickened portion comprising feed rollers and output rollers displaced from each other in the direction of travel of said web, between said feed and output rollers and disposed on either side of said traveling web a plurality of holding devices each including a driving wheel which engages said marginal reinforced thickened portion of said web material and a pair of driven wheels which operate in conjunction with said driving wheel to firmly grip said reinforced thickened portion and impart motion thereto in the direction from said feed rollers to said output rollers, means for individually controlling the peripheral speed of each of said driving wheels and means for individually moving said holding devices transversely to the direction of travel of said web material.

2. An apparatus for biaxially stretching a continuous traveling web material having a marginal reinforced thickened portion comprising feed rollers and output rollers displaced from each other in the direction of travel of said web, between said feed and output rollers and disposed on either side of said traveling web a plurality of holding devices each including a driving wheel which engages said marginal reinforced thickened portion of said web material and a pair of driven wheels which operate in conjunction with said driving wheel to firmly grip said reinforced thickened portion and impart motion thereto in the direction from said feed rollers to said output rollers, means for individually controlling the peripheral speed of each of said driving wheels, means for individually moving said holding devices transversely to the direction of travel of said web material, and means disposed on the last said holding device before said web passes through said output rollers for separating said web from said marginal reinforced thickened portion.

3. An apparatus for biaxially stretching a continuous traveling thermoplastic foil web having marginal reinforced thickened portions which comprises a pair of feed rollers and a pair of output rollers parallel with and spaced from said feed rollers, a plurality of holding devices each including a driving wheel which engages said marginal reinforced thickened portion of said foil web and a pair of driven wheels which operate in conjunction with said driving wheel to firmly grip said reinforced thickened portion and impart motion thereto in the direction from said feed rollers to said output rollers, means for individually moving said holding devices transversely to the direction of travel of said foil web and means for individually controlling the peripheral speed of each of said driving wheels thereby controlling the marginal speed of said foil web at each holding device which comprises a motor, a plurality of regulating gears connected in series with said motor and with each other, the total number of holding devices being divided into a plurality of sections, each holding device of each section connected through a gear train to one of said regulating gears to thereby permit the continuous regulation of the speed of each section of holding devices by varying the regulating gear and also to permit the regulation of the speed of each holding device by altering the ratio within each gear train.

4. An apparatus for biaxially stretching a continuous traveling thermoplastic foil web having marginal reinforced thickened portions which comprises a pair of feed rollers and a pair of output rollers parallel with and spaced from said feed rollers, a means for heating the area between said feed and output rollers, a plurality of holding devices each including a driving wheel which engages said marginal reinforced thickened portion of said foil web and a pair of driven wheels which operate in conjunction with said driving wheel to firmly grip said reinforced thickened portion and impart motion thereto in the direction from said feed rollers to said output rollers, means for individually moving said holding devices transversely to the direction of travel of said foil web and means for individually controlling the peripheral speed of each of said driving wheels thereby controlling the marginal speed of said foil web at each holding device which comprises a motor, a plurality of regulating gears connected in series with said motor and with each other, the total number of holding devices being divided into a plurality of sections, each holding device of each section connected through a gear train to one of said regulating gears to thereby permit the continuous regulation of the speed of each section of holding devices by varying the regulating gear and also to permit the regulation of the speed of each holding device by altering the ratio within each gear train.

5. An apparatus for biaxially stretching a continuous traveling thermoplastic foil web having marginal reinforced thickened portions which comprises a pair of feed rollers and a pair of output rollers parallel with and spaced from said feed rollers, a plurality of holding devices each including a driving wheel which engages said marginal reinforced thickened portion of said foil web and a pair of driven wheels which operate in conjunction with said driving wheel to firmly grip said reinforced thickened portion and impart motion thereto in the direction from said feed rollers to said output rollers, a means for moving said pair of driven wheels away from said driving wheel to initially permit the disposition of said marginal thickened portion of said foil web therebetween, means for individually moving said holding devices transversely to the direction of travel of said foil web and means for individually controlling the peripheral speed of each of said driving wheels thereby controlling the marginal speed of said foil web at each holding device which comprises a motor, a plurality of regulating gears connected in series with said motor and with each other, the total number of holding devices being divided into a plurality of sections, each holding device of each section connected through a gear train to one of said regulating gears to thereby permit the continuous regulation of the speed of each section of holding devices by varying the regulating gear and also to permit the regulation of the speed of each holding device by altering the ratio within each gear train.

6. An apparatus for biaxially stretching a continuous traveling thermoplastic foil web having marginal reinforced thickened portions which comprises a pair of feed rollers and a pair of output rollers parallel with and spaced from said feed rollers, a means for heating the area between said feed and output rollers, a plurality of holding devices each including a driving wheel which engages said marginal reinforced thickened portion of said foil web and a pair of driven wheels which operate in conjunction with said driving wheel to firmly grip said reinforced thickened portion and impart motion thereto in the direction from said feed rollers to said output rollers, a means for moving said pair of driven wheels away from said driving wheel to initially permit the disposition of said marginal thickened portion of said foil web therebetween, means for individually moving said holding devices transversely to the direction of travel of said foil web and means for individually controlling the peripheral speed of each of said driving wheels thereby controlling the marginal speed of said fold web at each holding device which comprises a motor, a plurality of regulating gears connected in series with said motor and with each other, the total number of holding devices being divided into a plurality of sections, each holding device of each section connected through a gear train to one of said regulating gears to thereby permit the continuous regulation of the speed of each section of holding devices by varying the regulating gear and also to permit the regulation of the speed of each holding device by altering the ratio within each gear train.

7. An apparatus for biaxially stretching a continuous traveling film sheet having marginal reinforced portions which comprises in combination film feed means and film output means each displaced from the other in the direction of travel of said film sheet, a plurality of holding devices positioned between said film feed and film output means and disposed on either side of said traveling film, each of said holding devices including a driving means for marginally driving said film from said film feed means to said film output means, a driven means positioned horizontally adjacent to and in spaced relationship from said driving means and adapted to operate in conjunction with said driving means to grip and impart motion to said film in a direction from said film feed means to said film output means, and means for individually moving each of said holding devices in a direction transverse to the direction of travel of said film sheet.

References Cited in the file of this patent

UNITED STATES PATENTS

| | | |
|---|---|---|
| 2,618,012 | Milne | Nov. 18, 1952 |
| 2,668,988 | Bailey et al. | Feb. 16, 1954 |
| 2,728,941 | Alles et al. | Jan. 3, 1956 |
| 2,778,057 | Clark | Jan. 22, 1957 |
| 2,866,231 | Vaughan | Dec. 30, 1958 |
| 2,923,966 | Tooke et al. | Feb. 9, 1960 |
| 3,007,204 | Veiel et al. | Nov. 7, 1961 |